United States Patent
Shelton et al.

(10) Patent No.: US 7,525,675 B2
(45) Date of Patent: Apr. 28, 2009

(54) IMAGE PRINTING VIA A PROOF SHEET

(75) Inventors: Michael J. Shelton, Boise, ID (US); Matthew B. Cooley, Boise, ID (US); Robert Sesek, Meridian, ID (US); Brian S. Bearden, Boise, ID (US)

(73) Assignee: Hewlett-Packard Development Company, L.P, Houston, TX (US)

( * ) Notice: Subject to any disclaimer, the term of this patent is extended or adjusted under 35 U.S.C. 154(b) by 973 days.

(21) Appl. No.: 10/774,261

(22) Filed: Feb. 6, 2004

(65) Prior Publication Data

US 2005/0185204 A1 Aug. 25, 2005

(51) Int. Cl.
G06F 3/12 (2006.01)
(52) U.S. Cl. ............... 358/1.13; 358/1.18; 358/3.24
(58) Field of Classification Search ............ 715/202; 358/1.1–1.9, 1.11–1.18; 355/40
See application file for complete search history.

(56) References Cited

U.S. PATENT DOCUMENTS

| 5,359,387 A | 10/1994 | Hicks |
| 6,141,111 A | 10/2000 | Kato |
| 6,623,528 B1 | 9/2003 | Squilla et al. |
| 2001/0019416 A1 | 9/2001 | Monty et al. |
| 2001/0040685 A1 | 11/2001 | Winter et al. |
| 2002/0051201 A1 | 5/2002 | Winter et al. |
| 2003/0020945 A1 | 1/2003 | Lopez et al. |
| 2004/0174562 A1* | 9/2004 | Edwards ............ 358/1.18 |

FOREIGN PATENT DOCUMENTS

| JP | 2001325082 | 11/2001 |
| JP | 2003094733 | 4/2003 |

OTHER PUBLICATIONS

Press Release, Mar. 22, 1999 "Compaq Goes All-In-One With New A900 For Printing, Faxing, Color Copying and Scanning".
Compaq A1000 All-In-One User Guide, 1999.
Compaq A900 All-In-One User Guide, 1998.
Search Report for patent application No. GB0502158.9, filed Feb. 2, 2005. Search completed May 4, 2005.

* cited by examiner

*Primary Examiner*—King Y Poon
*Assistant Examiner*—Lennin R Rodriguez

(57) ABSTRACT

A method for printing images. A plurality of proof sheets having a thumbnail representation of at least some of the images, and at least one user-markable field indicative of at least one corresponding image when marked are printed. User-marked ones of the proof sheets are optically scanned to detect marked ones of the at least one user-markable field. The marked fields are processed to determine at least one selected image associated with each scanned proof sheet. At least one selected image is printed after the user-marked proof sheets have been scanned.

15 Claims, 16 Drawing Sheets

Distribution Summary Sheet

Event ID: |..|..||.|..|||..|.|..||.|   Kerri's Wedding

| | User Name | Size | Quantity |
|---|---|---|---|
| A | Auntie Claire | 8x10 | 1 |
| | Aunt Doris | 5x7 | 2 |
| | Auntie Evie | 8x10 | 2 |
| C | Auntie Claire | 4x6 | 2 |
| | Aunt Doris | 4x6 | 3 |
| D | Auntie Claire | 4x6 | 1 |
| E | Aunt Doris | 5x7 | 2 |
| F | Auntie Evie | 8x10 | 1 |

FIG. 13

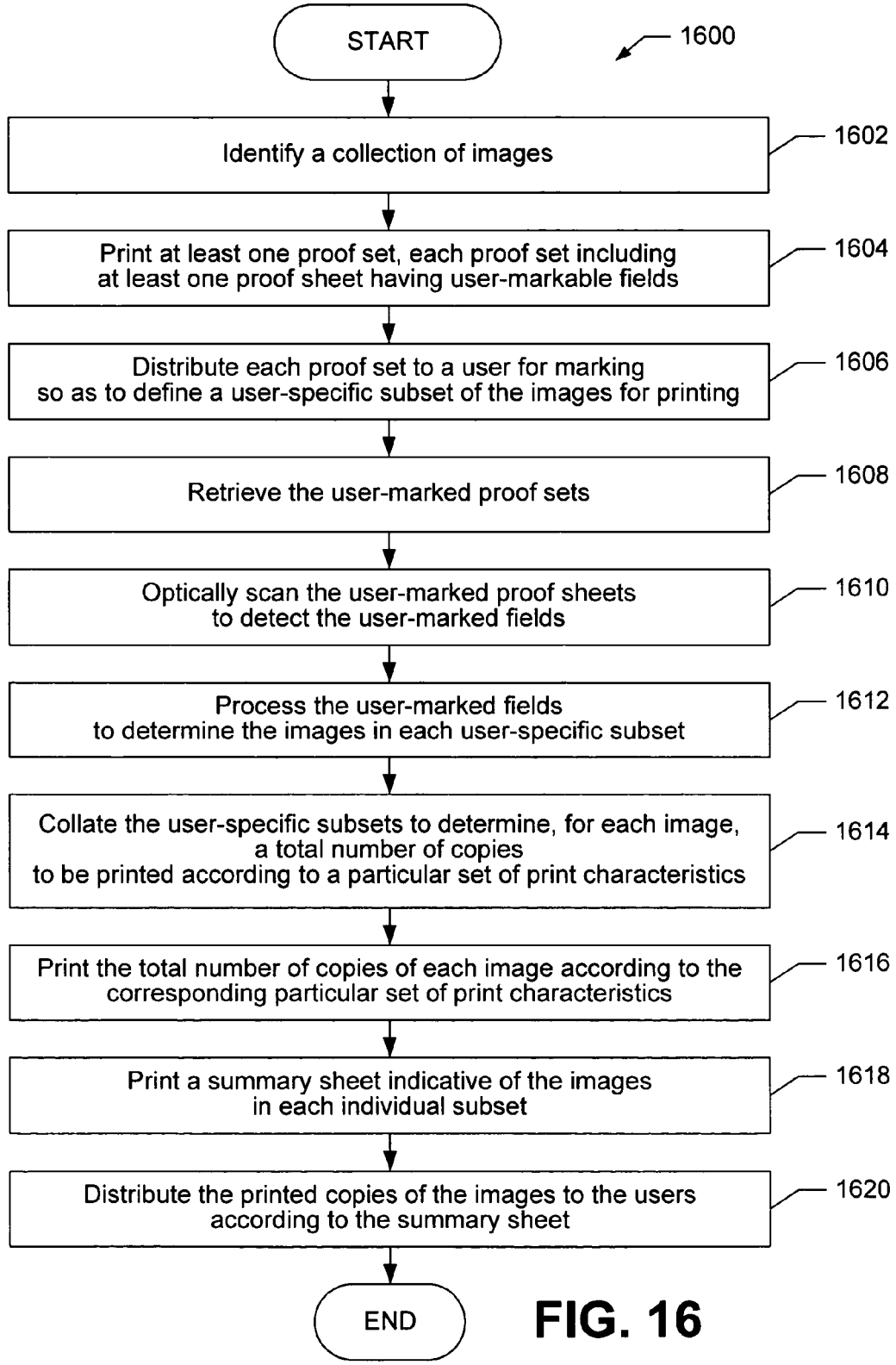

IMAGE PRINTING VIA A PROOF SHEET

CROSS-REFERENCE TO RELATED APPLICATIONS

This application relates to the subject matter disclosed in the co-pending U.S. application Ser. No. 09/767,935 by Monty et al., filed Jan. 23, 2001, titled "Wire-Speed Data Transfer in a Storage Virtualization Controller", which is assigned to the assignee of the present invention and hereby incorporated by reference in its entirety.

BACKGROUND OF THE INVENTION

A collection of photographs are often taken at significant events that are attended by a number of persons. Examples of such events may include weddings, family parties, business conferences, and organized trips, while the photographs may be taken by professional photographers and/or some of the attendees. Many of the attendees may desire to obtain their own printed copies of certain ones of these photos.

However, the process of having a large number of people review the photos and make their selections, and having another person or business organize, procure, and distribute the printed copies can be cumbersome and time consuming. Further complicating matters, some purchasers may be willing to spend only a limited amount of money on purchasing the printed copies. Additionally, in some cases a purchaser may lose their printed copies and desire replacements, or wish to procure another set for a friend or relative. For these and other reasons, there is a need for the present invention.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein:

FIG. 13 is an illustration of one embodiment of a summary sheet in accordance with an embodiment of the present invention printable by the printing system of FIG. 1 and usable for distributing printed images;

FIG. 16 is a flowchart in accordance with an embodiment of the present invention of a method for printing subsets of images selected from an image collection.

DESCRIPTION OF THE PREFERRED EMBODIMENT

Figure 1:
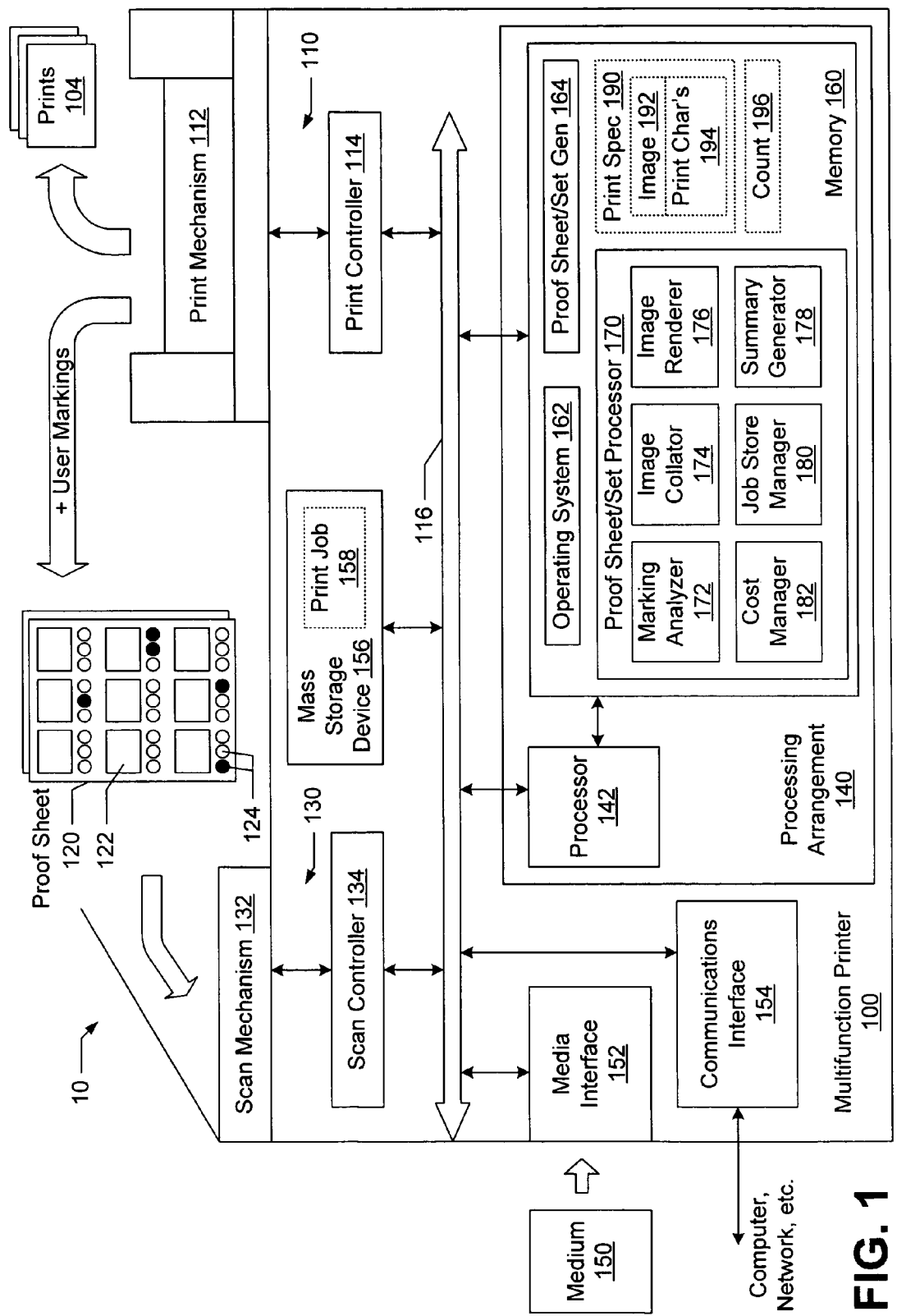
FIG. 1 is a schematic block diagram representation of a printing system in accordance with an embodiment of the present invention.

Referring now to the drawings, there is illustrated an embodiment of a printing system constructed in accordance with the present invention which prints a user-specified number of copies of user-selected ones of a collection of images according to any additional user-specified print characteristics. The system includes a printing arrangement which prints a proof sheet associated with the collection of images. After the entry of user markings on the proof sheet, the marked proof sheet is optically scanned by a scanning arrangement which detects the user markings thereon. A processing arrangement interprets the user markings and causes the printing arrangement to print the specified number of copies of the selected images.

Considering now the printing system in greater detail, and with reference to FIG. 1, one embodiment of the printing system 10 includes a multifunction printer 100. The printer 100 includes a printer subsystem 110 that is configured to print a plurality of proof sheets 120 associated with an image collection, and prints 104 corresponding to selected images from the image collection. The printer subsystem 110 includes a print mechanism 112 which forms the desired imaging on a sheet of media such as paper or coated photographic media. The print mechanism 112 may form the image using, for example, laserjet, inkjet, or other printing technologies, which may utilize media marking substances such as ink, toner, and the like. The printer subsystem 110 also includes a print controller 114 which receives print data and controls the print mechanism 112 to form the corresponding imaging. Printer 100 may also include user controls (not shown) that may be operated to cause printer 100 to print proof sheets 120 and/or scan user-marked proof sheets 120.

Each proof sheet 120 includes thumbnail representations 122 of a subset of the image collection, and at least one field 124 that is user-markable to select at least one of the images for printing. The subset may include one or more of the images in the collection.

In some embodiments, the plurality of proof sheets include multiple proof sheets which are each indicative of the same subset of the image collection. As will be discussed subsequently in greater detail, different ones of the multiple proof sheets may be distributed to different users, several of whom may desire to obtain printed copies of the same image. In other embodiments, and as also will be discussed subsequently in greater detail, a group of proof sheets may form a proof set, and proof sets that are each indicative of the image collection may be distributed to different users, several of whom may desire to obtain printed copies of one or more of the same images in the collection.

The printer 100 also includes an optical scanner subsystem 130 configured to scan one or more user-marked proof sheets 120 so as to form scan data that is indicative of the images selected for printing by the user. The scanner subsystem 130 includes a scan mechanism 132, which in one embodiment includes a platen on which the proof sheet 120 to be scanned is positioned, and a scan controller 134 which operates the scan mechanism 132 and acquires the scan data. In other embodiments, scanner subsystem 130 may include an automatic document feeder (not shown) for receiving and positioning the proof sheet 120 for scanning.

The printer 100 further includes a processing arrangement 140 coupled to the printer subsystem 110 and the optical scanner subsystem 130. The coupling between and among the various subsystems and components of printer 100 may be via bus 116. In some embodiments, at least portions of processing arrangement 140, print controller 114, and bus 116 may reside in a single processor. The processing arrangement 140 processes the scan data for the marked proof sheet 120 that is received from the scan controller 134. As will be discussed subsequently in greater detail, the processing arrangement 140 identifies the user-selected images as indicated on the proof sheet 120, and determines a number of print copies that are associated with each selected image. The processing arrangement 140 acquires the image data corresponding to each selected image, renders the image data according to the associated print characteristics, and provides the rendered image data to the printer subsystem 110 to print the desired number of copies of each selected image.

The image data for an image is typically provided as digital data stored in a predefined image file format, such as, for example, JPG format, GIF format, BMP format, and the like. In some embodiments, the image data may reside on a storage medium 150 which is intermittently coupleable to a media interface 152 coupled to the processing arrangement 140. Storage medium 150 may use, for example, flash memory or rotating disk technology, or the like. In other embodiments, the image data may reside on a computer or network (not shown) connected to the printer 100 via a communications interface 154, such as, for example, a network card, modem, or other such communications device, that is coupled to the processing arrangement 140. Such networks may include, for example, the Internet, intranets, wide area networks (WANs), local area networks, wireless networks, or other suitable networks, etc., or any combination of two or more such networks. In still other embodiments, the image data may reside on a mass storage device 156 within the printer 100 that is coupled to the processing arrangement 140. Printer 100 may employ one or more of these or other image data file access methods.

In some embodiments, the processing arrangement 140 includes a processor 142, and a memory 160 coupled to the processor 142. Memory 160 may include both volatile and nonvolatile memory and data storage components. Volatile components are those that do not retain data values upon loss of power. Nonvolatile components are those that retain data upon a loss of power. Thus, memory 160 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In one embodiment, printer 100 includes a number of software components that are stored in a computer-readable medium, such as memory 160, and are executable by processor 142. In this respect, the term "executable" means a program file that is in a form that can be directly (e.g. machine code) or indirectly (e.g. source code that is to be compiled) performed by the processor 142. Furthermore, the term "software" as used herein and in the appended claims is broadly defined to include firmware. An executable program may be stored in any portion or component of the memory 160. Each software component comprises logic that implements the functionality of that component. In this regard, printer 100 includes an operating system 162 that controls the allocation and usage of resources in printer 100 such as the memory, processing time, and access to other subsystems and components. In this manner, the operating system 162 serves as a foundation on which applications can be built and executed.

The printer 100 contains a proof sheet/proof set generator 164 software component that formats proof sheets 120 for subsets of the image collection and controls printer subsystem 110 to print the proof sheets. Formatting a proof sheet 120 may include determining which images are to be included in the subset for an individual proof sheet 120. In some embodiments where there are more images in the collection than can be represented on a single proof sheet, the generator 164 may format a proof sheet set comprising multiple proof sheets 120, each of which represents different ones of the images. For each proof sheet 120, generator 164 obtains or generates thumbnail representations 122 of the images in the subset. As defined herein and in the appended claims, a thumbnail representation shall be broadly understood to mean a miniature visual representation of the image. Generating a thumbnail representation 122 for an image may include rendering the image data in a miniature size; for example, 75 by 100 pixels. Formatting the proof sheet also includes rendering user-markable fields, such as user-markable fields 124, some of which may be associated with one or more of the images. The user-markable fields may indicate a print size, print finish, or other print characteristics, and a number of copies to be printed. The rendered data for each formatted proof sheet is outputted as print data to the printer subsystem 110 for printing on a sheet of media. The format, layout, and function of various embodiments of proof sheet 120 will be discussed subsequently in greater detail with reference to FIGS. 2-5.

The printer 100 also contains a proof sheet/proof set processor 170 software component that processes the scan data for each proof sheet and produces the user-requested prints. A marking analyzer 172 knowledgable of the layout and function of the various user-markable fields on the proof sheet correlates the user-markings in the scan data with the marked ones of the fields, in order to determine each user-selected image 192, user-specified print characteristics 194 associated with each image 192, print copy count 196, and any other user-entered or preprinted parameters such as an event identifier and/or a user identifier. Each image 192 and its associated print characteristics 194 may form a print specification 190, and print copy count 196 may be associated with the print specification 190.

If multiple user-marked proof sheets 120 have been scanned and the combined user-selected images are to be printed, an image collator 174 software component examines the print specifications 190 to determine identical print specifications 190. If identical print specifications 190 are identified, the collator 174 sums the print copy counts 196 associated with the identical print specifications 190, sets the print copy count 196 of one of the identical print specifications 190 to the sum, and deletes (or inhibits printing of) all the other ones of the identical print specifications 190. In this manner, the desired total number of copies of the image can be printed in the most efficient manner, which typically includes rendering the image 192 according to the associated print characteristics 194 one time, and printing the rendered image the desired total number of times to form the corresponding number of prints 104. An image renderer 176 software module performs the rendering operations. The operations performed by one embodiment of the image collator 174 will be described subsequently in greater detail with reference to FIG. 12.

In embodiments where the proof sheets 120 are part of proof sheet sets, a summary generator 178 software module prints a summary sheet for each event identifier that is indicative of the prints 104 that are associated with each user identifier. Thus the summary sheet is useful in distributing the prints 104 to the various users. The summary sheet will be described subsequently in greater detail with reference to FIG. 13.

In some embodiments, a job store manager 180 software module generates a print job 158 indicative of the selected images, any associated print characteristics, and the associated number of print copies. The print job 158 may be stored on the mass storage device 156. Alternatively, the print job 158 may be stored on storage medium 150 or on a computer or network attached to printer 100. One embodiment of the storage of print job 158 will be discussed subsequently in greater detail with reference to FIG. 15.

In some embodiments, a cost manager 182 software module identifies a user-specified maximum printing cost, and prints the copies of the selected images for less than or equal to the maximum printing cost. The operation of one embodiment of cost manager 182 will be discussed subsequently in greater detail with reference to FIG. 10.

Although the printer 100 as described heretofore includes a number of software components, as an alternative these components may also be embodied in hardware, or in a combination of software and hardware. If embodied in hardware, the components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc.

Figure 2:
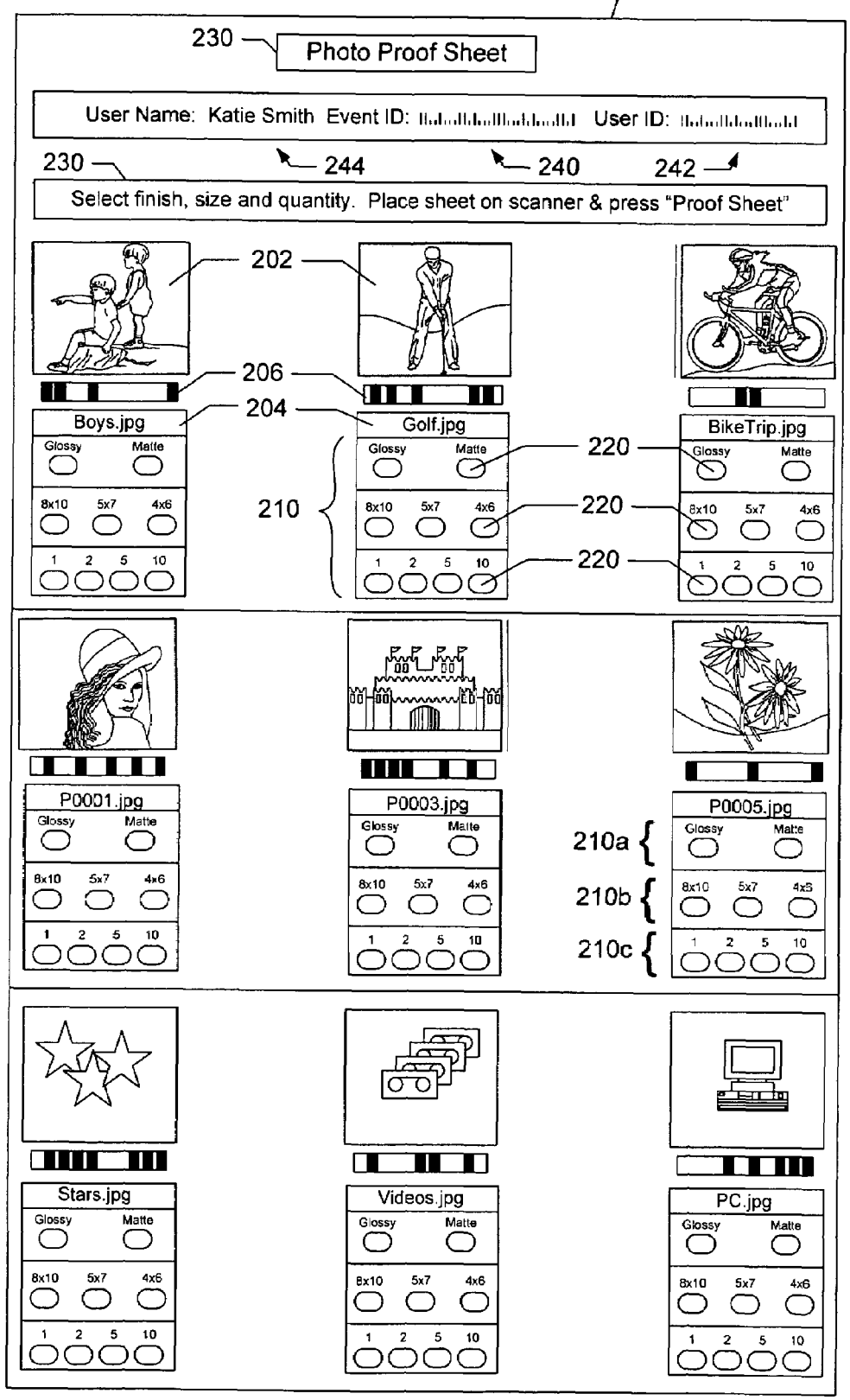
FIG. 2 is an illustration of one embodiment of a proof sheet in accordance with an embodiment of the present invention printable by the printing system of FIG. 1 and usable for selecting images for printing and specifying print characteristics.

Considering now in greater detail the format, layout, and function of one embodiment of a proof sheet, and with reference to FIG. 2, exemplary proof sheet 120a is associated with an image collection subset having nine images. While the exemplary proof sheet 120a is associated with nine images, other proof sheet embodiments can be associated with different numbers of images, depending on, for example, the thumbnail representation size, media sheet size, number and type of user-markable fields on the proof sheet, and the like.

For each image in the subset, proof sheet 120a is imprinted with a thumbnail representation 202, a filename 204, an identity marker 206 having an optically scanable encoded pattern usable to retrieve the image data, and a user-markable region 210 having one or more fields 220 that are markable by a user in order to select the image for printing and specify one or more print characteristics to be associated with the printed image, such as a print size and a print finish, and/or a number of copies of prints of the image to be produced. The user typically marks a field 220 by filling-in substantially all of the field 220 with a marker such as a pen or pencil, although in some embodiments other markings, such as an "X" placed in the field 220, may be used. Alternatively, one or more fields may be configured as alphanumeric entry fields, and one or more alphanumeric characters entered in such fields may be identified after optical scanning by techniques such as optical character recognition ("OCR").

Typically the fields 220 associated with each image are identical, but alternatively they may be different. In some embodiments the user-markable region 210 may be organized into subregions, such as print finish subregion 210a, print size subregion 210b, and print copy count subregion 210c. On exemplary proof sheet 120a, print finish subregion 210a includes a "Glossy" field and a "Matte" field to allow the user to specify the type of print finish on the print media used for printing the associated image; print size subregion 210b includes an "8×10" field, a "5×7" field, and a "4×6" field to allow the user to specify the size of printed image; and print copy count subregion 210c includes "1", "2", "5", and "10" fields to allow the user to specify the number of copies of the image to be printed. Typically only one field is marked in each subregion 210a-c. Typically an image is selected for printing if at least one of the associated fields 220 is marked. If none of the fields 220 in a particular subregion 210a-c for a selected image is marked, then typically either a default is assigned, or the lack of a user selection is treated as a "don't care" condition. For example, if at least one field 220 in either print finish subregion 210a or print size subregion 210b is marked by the user, but no field in print copy count subregion 210c is marked, the number of printed copies could be defaulted to one. Similarly, if at least one field 220 in either print size subregion 210b or print copy count subregion 210c is marked by the user, but no field in print finish subregion 210a is marked, the most inexpensive or the most recently-used print finish could be selected. In other embodiments, a user might be notified by the printer 100 if a proof sheet was improperly or incorrectly marked. For example, marking more than one field 220 in the print finish subregion 210a might be considered erroneous.

In some embodiments, the proof sheet may contain one or more identifiers. For example, the exemplary proof sheet 120a includes an Event identifier 240 that is indicative of the collection of images, and a User identifier 242 that is indicative of the user to whom the proof sheet is provided. Typically these identifiers are printed on the proof sheet, but some or all of the identifiers may be marked thereon by the user. On exemplary proof sheet 120a, the identifiers are indicated as bar codes, but other optically scanable representations may be used, including alphanumeric representations recognizable by OCR techniques. In some embodiments, an alphanumeric representation of the identifiers, such as the printed user name "Katie Smith" 244, may also be included on the proof sheet for the convenience of the user. The proof sheet may also contain informational regions, such as region 230, which can provide instructions or information to the user in alphanumeric and/or pictorial form.

Figure 3:
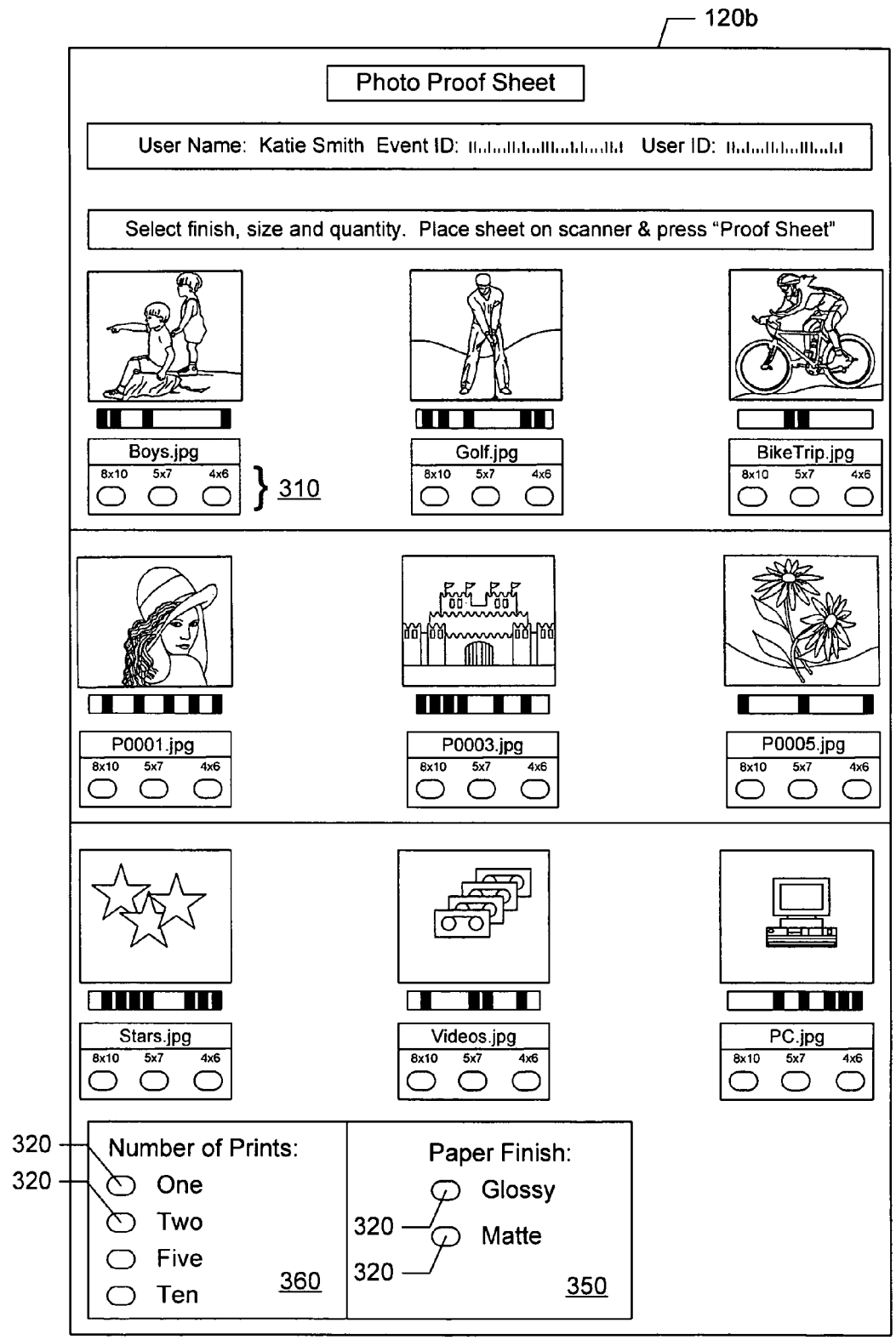
FIG. 3 is an illustration of another embodiment of a proof sheet in accordance with an embodiment of the present invention printable by the printing system of FIG. 1 and usable for selecting images for printing and specifying print characteristics.

Considering now the format, layout, and function of another embodiment of a proof sheet, and with reference to FIG. 3, exemplary proof sheet 120b is similar to proof sheet 120a. However, user-markable region 310 associated with an individual image includes only a print size subregion, so that only the print size can be individually specified for different selected images. Proof sheet 120b includes a global print finish region 350 and a global print copy count region 360. The fields 320 marked by the user in regions 350-360 apply to the printing of all of the selected images.

Figure 4:
FIG. 4 is an illustration of another embodiment of a proof sheet in accordance with an embodiment of the present invention printable by the printing system of FIG. 1 and usable for storing a print job.

Considering now the format, layout, and function of yet another embodiment of a proof sheet, and with reference to FIG. 4, exemplary proof sheet 120c is similar to proof sheet 120a. However, proof sheet 120c includes a stored job region 450. Stored job region 450 includes a storage mode subregion 452 for specifying how a print job associated with one or more scanned proof sheets will be stored, and a retention time subregion 454 for specifying how long the stored print job will be retained.

While exemplary proof sheet 120c illustrates one stored job region 450 that is associated with all images, alternative embodiments of the proof sheet 120c may have multiple stored job regions, with each stored job region associated with one or more images. Furthermore, in some embodiments each proof sheet may contain the stored job region 450, and the marked stored job fields will be applied to a print job for only the images selected on that proof sheet. In other embodiments, such as where multiple proof sheets are associated with a particular event via event identifier 240, only one of the multiple proof sheets may contain the stored job region 450 and the marked stored job fields will be applied to a print job for the images selected on all the multiple proof sheets associated with the event. Other configurations and applications are also possible.

Figure 5:
FIG. 5 is an illustration of another embodiment of a proof sheet in accordance with an embodiment of the present invention printable by the printing system of FIG. 1 and usable for printing images in accordance with a maximum cost.

Considering now the format, layout, and function of yet another embodiment of a proof sheet, and with reference to FIG. 5, exemplary proof sheet 120d is similar to proof sheet 120b. User-markable region 510 associated with an individual image includes only a print copy count subregion, so that only the number of prints can be individually specified for different selected images. However, proof sheet 120d includes a cost region 550 usable to enable the selected images to be printed for less than or equal to a maximum cost. Cost region 550 includes a maximum cost subregion 552 for specifying the maximum total or per-image cost allowable for printing the selected images; a desired print characteristic subregion 554 for specifying the print characteristics that the user would prefer to use in printing the images; a minimum acceptable print characteristic subregion 556 for specifying the print characteristics that the user would be willing to use in printing the images if necessary to achieve the specified cost; a priority subregion 558 for specifying the order in which print characteristics will be adjusted if necessary to achieve the specified cost; and a suggested adjustment subregion 560 for enabling or disabling the suggestion to the user of other print characteristic adjustments that would meet the specified maximum cost.

In some embodiments, the various fields 520 of the desired and minimum acceptable subregions 554-556 are arranged on the exemplary proof sheet 120d in an order that ranges from best to worst; for example, long-life is a better type of ink than standard.

While exemplary proof sheet 120d illustrates one cost region 550 that is associated with all images, alternative embodiments of the proof sheet may have multiple cost regions, with each cost region associated with one or more images. Furthermore, in some embodiments each proof sheet 120d may contain the cost region 550, and the marked cost fields 520 will be applied to only the images selected on that proof sheet. In other embodiments, such as where multiple proof sheets are associated with a particular event via event identifier 240, only one of the multiple proof sheets may contain the cost region 550 and the marked cost fields 520 will be applied to the images selected on all the multiple proof sheets associated with the event. Other configurations and applications are also possible.

Figure 6:
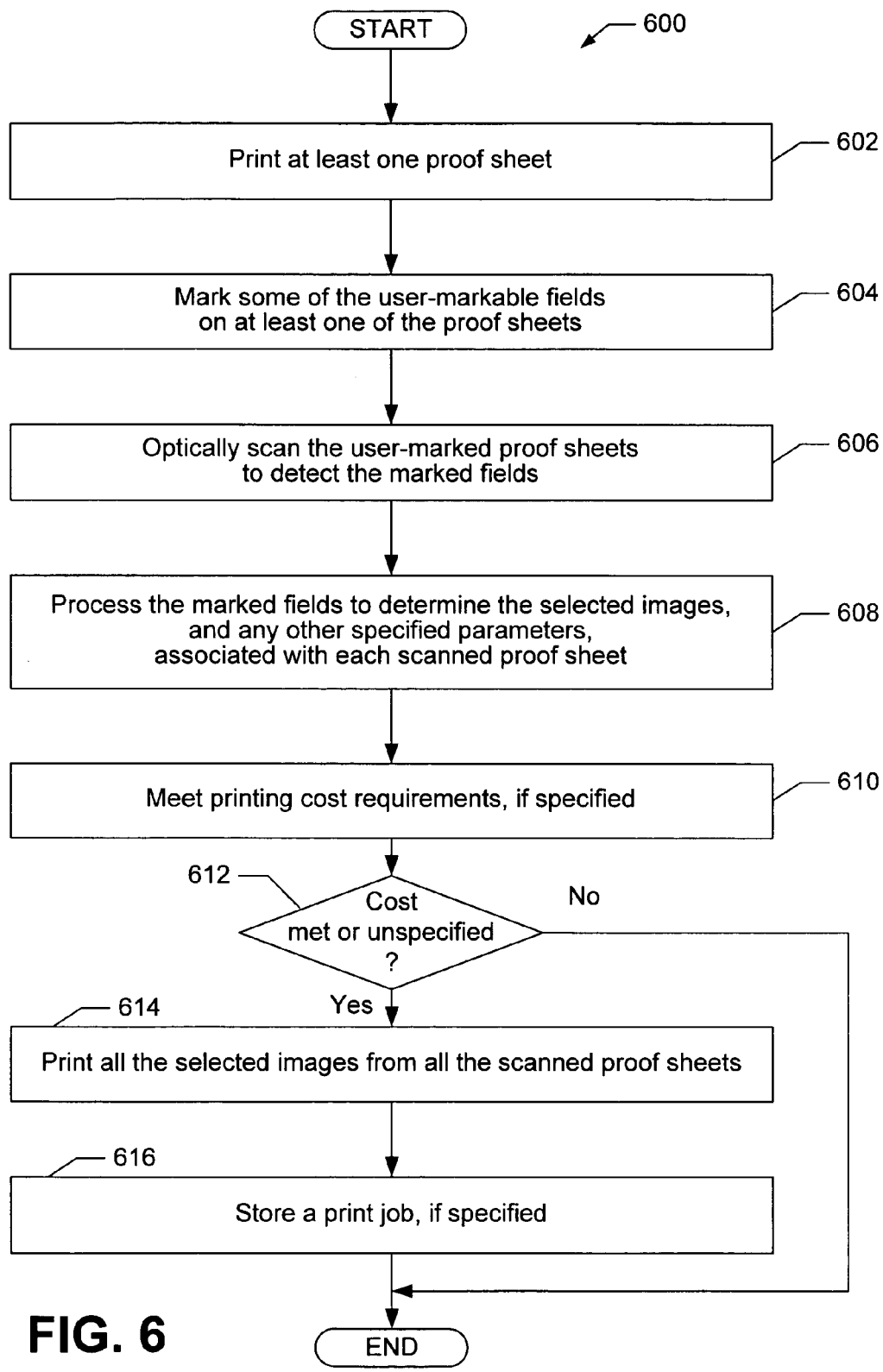
FIG. 6 is a flowchart in accordance with an embodiment of the present invention of a method for printing user-selected images from an image collection.

Another embodiment of the present invention, as best understood with reference to FIG. 6, is a method of printing images selected by a user-marked proof sheet. The top-level flowchart of FIG. 6, and the lower-level flowcharts of FIGS. 7, 8, 10, 12, 14, and 15 that relate to FIG. 6, may be considered as steps in a method implemented at least partially in the printer 100. Alternatively, portions of these flowcharts may be considered as describing the operation of the proof sheet/set generator 164 and the proof sheet/set processor 170 of printer 100.

The method 600 begins, at 602, by printing at least one proof sheet 120 associated with at least a portion of a collection of images. The collection may contain more images than can be printed on a single proof sheet 120. In some embodiments, the proof sheets may be organized into one or more proof sheet sets. Each proof sheet set is typically representative of the entire collection of images, where each proof sheet in the set is representative of a different subset of images, and each image is associated with only one of the proof sheets in the set. Multiple copies of the proof sheet set may be printed; for example, so that a proof sheet set may be given to each of a number of different users.

At 604, each of the one or more users mark some of the user-markable fields on at least one of the proof sheets, such as fields 220 on proof sheet 120a (FIG. 2). As described heretofore, the markings made by a user select images for printing, and specify print characteristics and the number of copies to be printed for the prints requested by that user. At 606, the user-marked proof sheets are optically scanned so as to detect the marked fields. By knowing or determining the format and layout of the proof sheets, the locations of the user markings can be correlated to the user-markable fields that have been marked by the user. At 608, the marked fields are processed to determine the selected images, and any other specified parameters such as print characteristics and number of print copies. At 610, in some embodiments, printing cost requirements for the selected images are analyzed to determine whether they can be met. These requirements may be specified on one of the proof sheets, such as proof sheet 120d (FIG. 5). Adjustment rules for modifying print characteristics to attempt to meet the cost requirements may also be specified on one of the proof sheets. If the cost requirements can be met or if no cost requirements were specified ("Yes" branch of 612), then at 614 all the selected images from all the scanned proof sheets are printed. Printing of the desired number of print copies 104 occurs according to the specified or adjusted print characteristics. At 616, in some embodiments, a print job is stored, and the method 600 ends. If the cost requirements cannot be met ("No" branch of 612), neither the printing 614 nor the storing 616 are performed.

Figure 7:
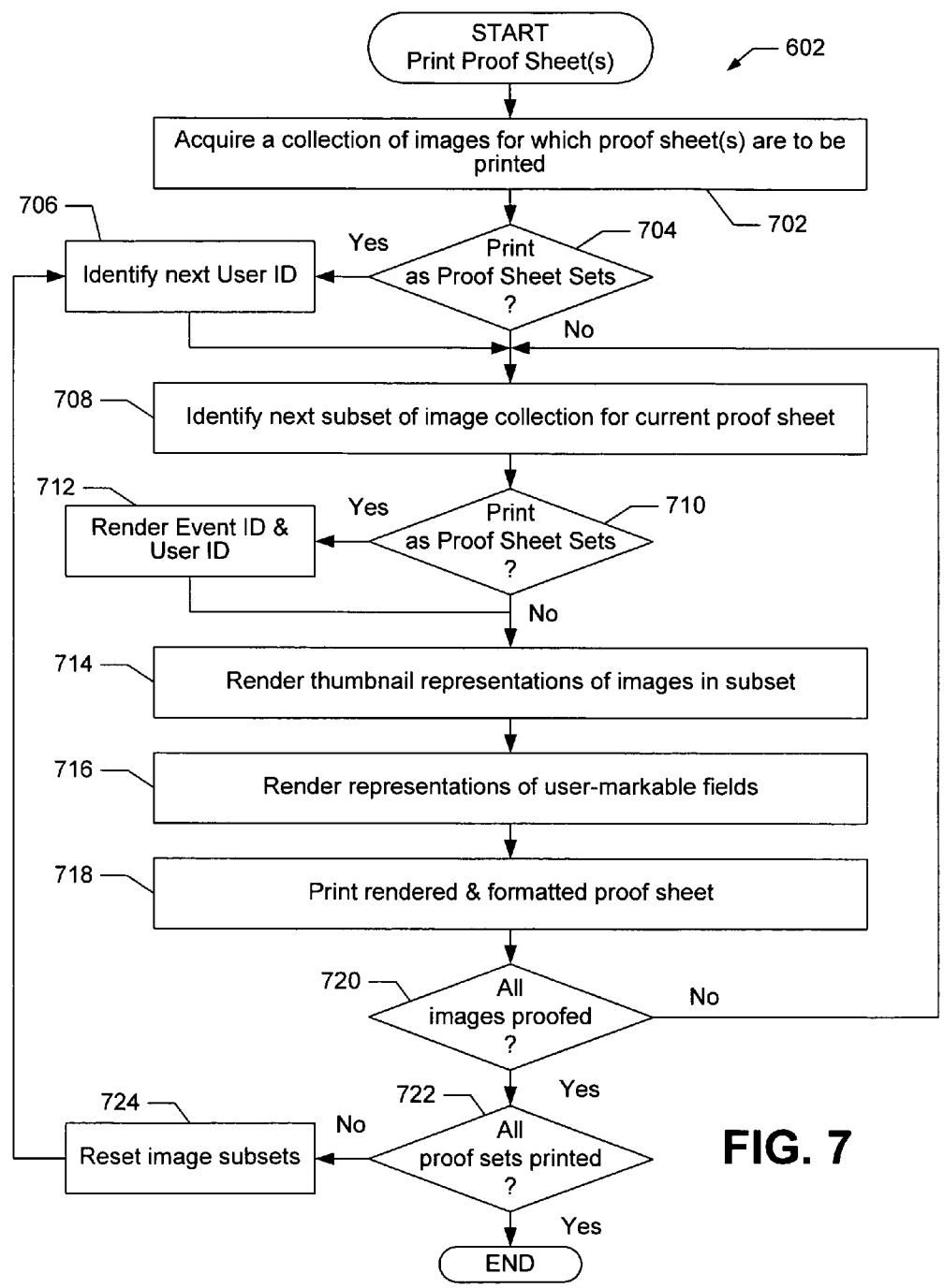
FIG. 7 is a lower-level flowchart of one embodiment according to the present invention of a proof sheet printing aspect of FIG. 6.

Considering now in further detail one embodiment of the printing 602 of at least one proof sheet, and with reference to FIG. 7, as part of the printing 602 a collection of images for which one or more proof sheets are to be printed is acquired at 702. Acquiring, as used herein and in the appended claims, is broadly defined to include obtaining the image data for some or all of the images from a source outside of the printer 100, such as storage medium 150 or a computer or network to which printer 100 is attached, or identifying image data which has previously been acquired by printer 100, such as image data stored on mass storage device 156. At 704, it is determined whether the proof sheet to be printed will be part of a proof sheet set. If so ("Yes" branch of 704), then at 706 the user identifier, such as user identifier 242 (FIG. 2), associated with the proof sheet to be printed is identified. Next, or if the proof sheet is not part of a proof sheet set ("No" branch of 704), the subset of the image collection to be associated with the current proof sheet to be printed is identified at 708. If the proof sheet is part of a proof set ("Yes" branch of 710), then at 712 the event identifier associated with the collection of images, such as event identifier 240 (FIG. 2), and the user identifier associated with the current proof sheet, such as user identifier 242, are rendered for printing on the proof sheet. At 714, thumbnail representations of the images in the subset, such as thumbnail representations 202 (FIG. 2) are rendered for printing on the proof sheet. At 716, representations of the user-markable fields and any other printable information are rendered for printing on the proof sheet. At 718, the rendered and formatted proof sheet is printed. If all the images in the collection have not yet been printed on one of the proof sheets ("No" branch of 720), the printing 602 continues at 708. If all the images in the collection have been printed ("Yes" branch of 720), then at 722 it is determined whether all the proof sets have been printed. If so, or if the proof sheet is not part of a proof set, then the printing 602 ends ("Yes" branch of 722). If there are more proof sets remaining to be printed ("No" branch of 722), then at 724 the currently selected image subset is reset to indicate that the next subset of images to be identified is the first subset, and the printing 602 continues at 706.

Figure 8:
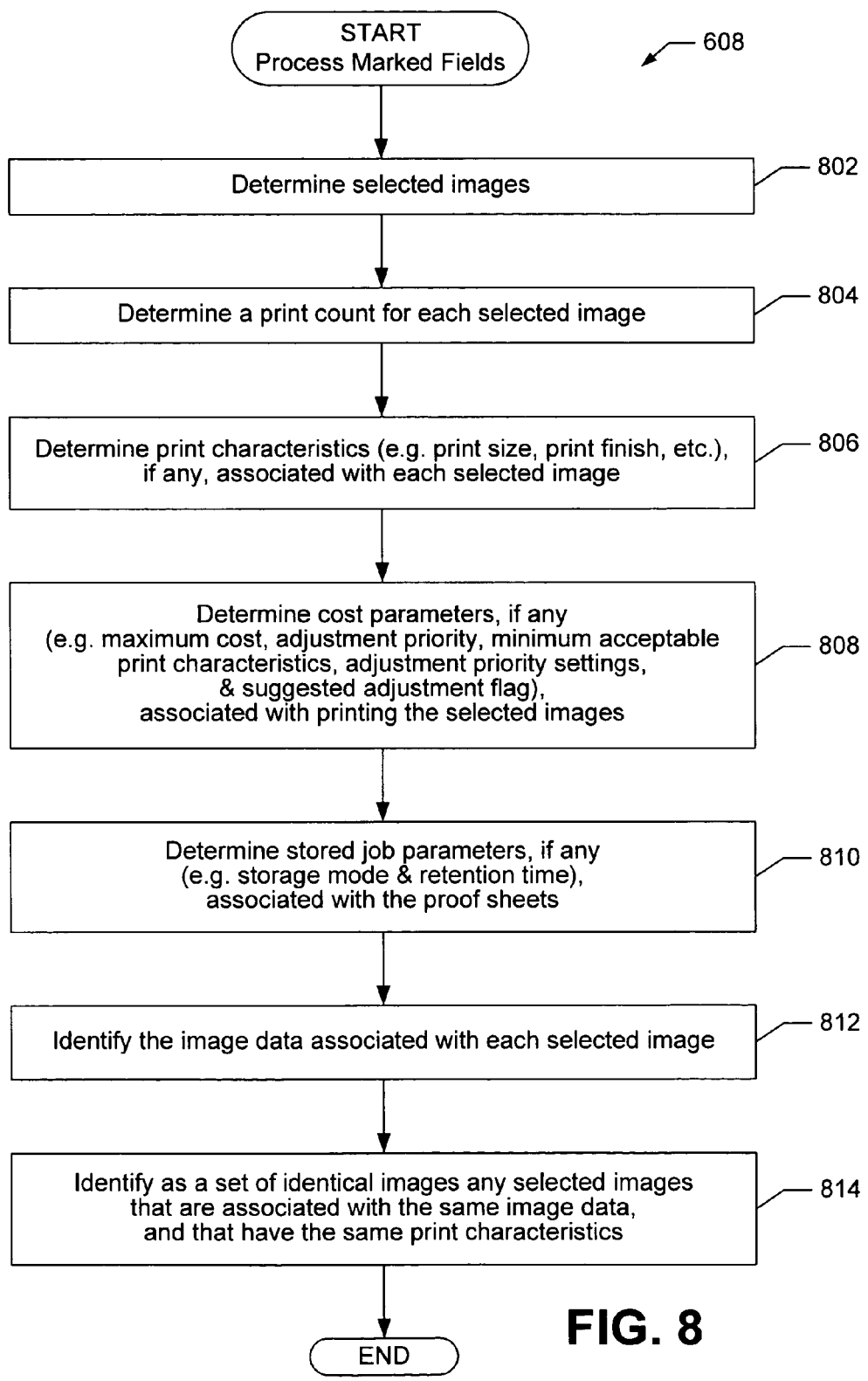
FIG. 8 is a lower-level flowchart of one embodiment according to the present invention of a marked fields processing aspect of FIG. 6.

Considering now in further detail one embodiment of the processing 608 of the marked fields, and with reference to FIG. 8, as part of the processing 608 the images selected by the user based on the user markings made on the proof sheet are determined at 802. As has been described heretofore with reference to the exemplary proof sheets 120a of FIG. 2, certain ones of the user-markable fields 220 in region 210 are associated with individual images, and marking one of these fields selects the associated image for printing. At 804, a print copy count for each selected image is determined. As has been described heretofore with reference to the exemplary proof sheets 120a-b of FIGS. 2-3, the user-markable fields 220,320 in subregions 210c,360 are indicative of print copy counts for one or more of the selected images. At 806, print characteristics, if any, associated with each selected image are determined. Print characteristics may include print size, print finish, and other characteristics. As has been described heretofore with reference to the exemplary proof sheets 120a-b of FIGS. 2-3, the user-markable fields 220,320 in subregions 210a-b,350,360 are indicative of print characteristics for one or more of the selected images. At 808, cost parameters, if any, associated with printing the selected images are determined. Cost parameters may include a maximum total or per-image cost, minimum acceptable print characteristics used for cost adjustment purposes, print characteristic adjustment priority settings, and a suggested adjustment enable/disable flag. As has been described heretofore with reference to the exemplary proof sheet 120d of FIG. 5, the user-markable fields 520 in subregions 552-560 are indicative of cost parameters. At 810, stored job parameters, if any, associated with storing a print job associated with the proof sheets are determined. Stored job parameters may include a storage mode and a retention time. As has been described heretofore with reference to the exemplary proof sheet 120c of FIG. 4, the user-markable fields 420 in region 450 are indicative of stored job parameters.

At 812, the image data associated with each selected image is identified. As has been described heretofore with reference to the exemplary proof sheet 120a of FIG. 2, an identity marker 206 having an optically scanable encoded pattern usable to retrieve the image data is printed on the proof sheet for each image in the image subset associated with the proof sheet. As illustrated on exemplary proof sheet 120a, there may be one identity marker for, and located adjacent to, each thumbnail representation 202 of the images in the subset. Other embodiments may include as few as one identity marker, and the marker or markers may be located elsewhere on the proof sheet. Each encoded pattern may be indicative of the filename of the image data, the storage location of the image data, or any other information that can be utilized to retrieve and access the image data.

At 814, any selected images that are associated with the same image data, and that have the same user-marked print characteristics, are identified as images having identical print specifications. In an embodiment where no print characteristics are specified, any selected images that are associated with the same image data are identified as identical images. After 814, the processing 608 ends.

The operation of step 814 can be further illustrated with reference to the three exemplary marked proof sheet sets of FIG. 9. Each proof sheet set includes three individual proof sheets. Each proof sheet may have, for example, the form of proof sheet 120a of FIG. 2. Proof sheet set 910 includes proof sheets 910a-c that have been marked by, and are associated with, a user named "Auntie Claire". Proof sheet set 920 includes proof sheets 920a-c that have been marked by, and are associated with, a user named "Aunt Doris". Proof sheet set 930 includes proof sheets 930a-c that have been marked by, and are associated with, a user named "Auntie Evie". Proof sheets 910a,920a,930a are all associated with the same subset of images, denoted as images A through F. The proof sheets are presented in a schematic form, with only the user-marked fields illustrated for clarity. By virtue of the user markings thereon, proof sheet 910a has a selected image 912; proof sheet 920a has a selected image 922; and proof sheet 930a has a selected image 932. Both selected image 912 and selected image 932 represent the same image A, and have the same user-marked print characteristic—a specified print size of 8×10—and are therefore denoted as having identical print specifications. Selected image 922, however, while also representing image A, has a different user-marked print characteristic—a specified print size of 5×7. Therefore, selected image 922 does not have the same print specification as either of selected images 912,932. As will be discussed subsequently in greater detail, it can be useful to identify identical print specifications because a total requested number of prints of the image associated with the print specification can often be printed more efficiently.

Figure 10:
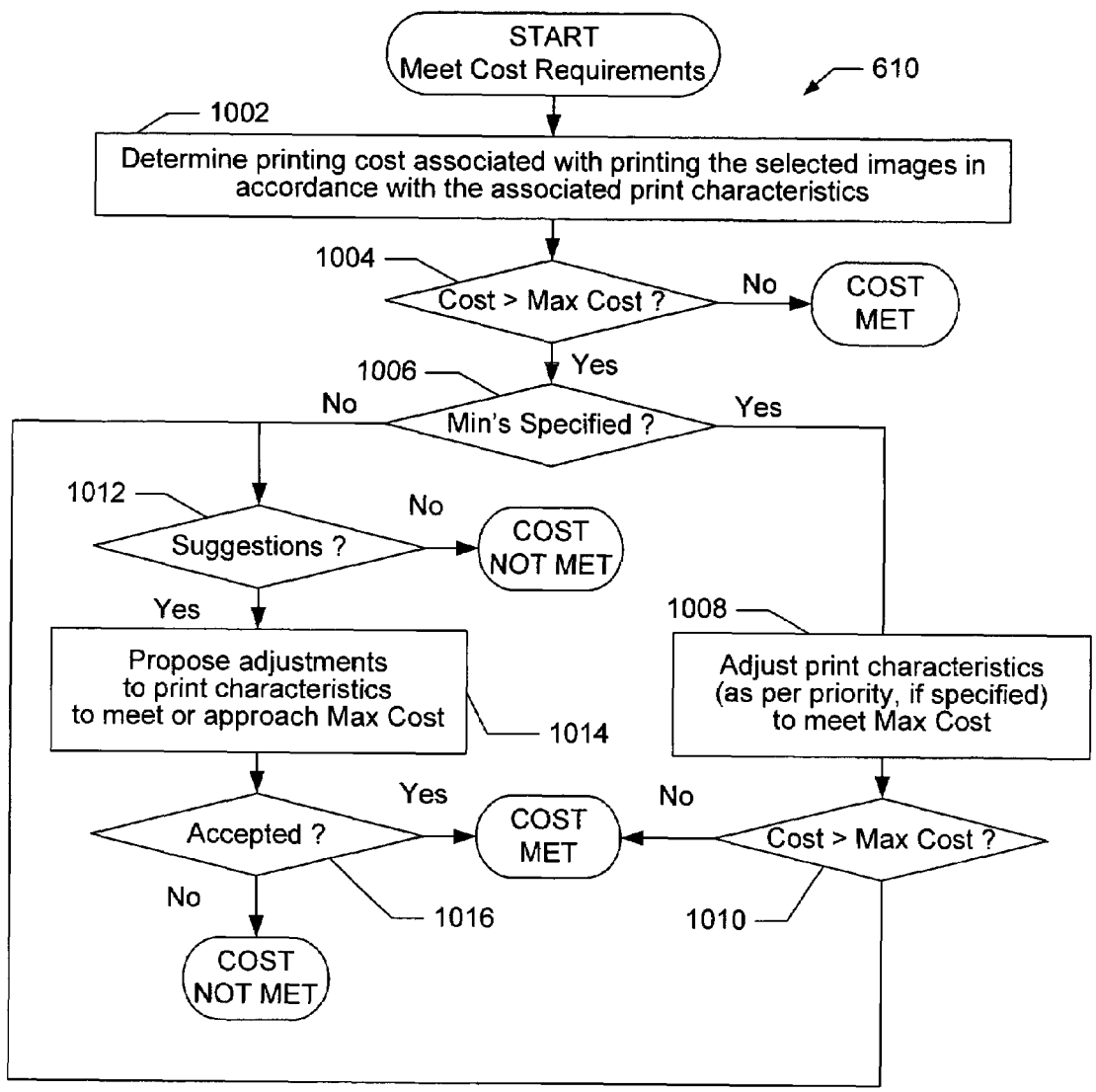
FIG. 10 is a lower-level flowchart of one embodiment according to the present invention of a cost requirement meeting aspect of FIG. 6.
Figure 11:
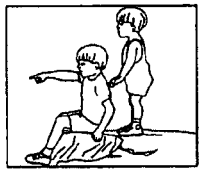
FIG. 11 is an illustration of an exemplary user-marked copy of the proof sheet of FIG. 5 useful as an example for illustrating the operation of the flowchart of FIG. 10.

Considering now in further detail one embodiment of the meeting 610 of cost requirements, and with reference to FIGS. 10 and 11, as part of the processing 610 a printing cost associated with printing the selected images in accordance with the associated print characteristics is determined at 1002. In one embodiment, a cost may be associated with each individual print characteristic, and the cost of a printed image may be calculated by summing the costs associated with its print characteristics. For illustrative purposes, assume the costs per image are as defined in Table I.

TABLE I

| Printing Costs | | |
|---|---|---|
| Print Size: | 8 × 10 | $2.00 |
| | 5 × 7 | $1.00 |
| | 4 × 6 | $0.75 |
| Print Finish: | Glossy | $0.50 |
| | Matte | $0.40 |
| Ink Type: | Long Life | $1.50 |
| | Standard | $0.75 |

FIG. 11 illustrates an exemplary user-marked proof sheet 1110 that is a user-marked version of the proof sheet 120d of FIG. 5. The user has specified that one copy of the image "Golf.jpg" and one copy of the image "P0001.jpg" are to be printed. The desired print characteristics are a print size of "8×10" (with a cost of $2.00), a print finish of "Glossy" (with a cost of $0.50), and an ink type of "Long Life" (with a cost of ($1.50). Summing these costs gives a cost of $4.00 for each print, or a total of $8.00 for the two prints. It should be noted that, in other embodiments, different or more sophisticated methods of determining printing cost may be used.

At 1004, it is determined whether the printing cost exceeds a maximum cost. If not ("No" branch of 1004), the cost requirement is met. However, for the exemplary user-marked proof sheet 1100, the printing cost of $4.00 per image does exceed the user-specified maximum cost of $2.00 per image, and therefore execution continues at 1006. If minimum acceptable print characteristic settings have been specified ("Yes" branch of 1006), then at 1008 the print characteristics to be used for printing the images are adjusted to try to meet the user-specified maximum cost.

In one embodiment, the adjustment may include changing a print characteristic from its current setting (which is initially the desired setting) to the next less-desirable setting. For example, changing ink type from the desired setting of "Long Life" to the next less-desirable setting of "Standard". However, a print characteristic will not be adjusted at 1008 to a setting that is less than the specified minimum acceptable setting. In some embodiments, the desirability of settings may be directly proportional to the print cost associated with the setting.

Additionally, if a priority for adjustment of print characteristics is specified by the user, the print characteristics will be adjusted in the specified order; that is, by adjusting lesser priority print characteristics before adjusting greater priority print characteristics. For example, on the exemplary proof sheet 1100, ink type is priority 1 (the highest priority), print finish is priority 2, and print size is priority 3 (the lowest priority). Therefore, print size will be adjusted first, followed by print finish, and then ink type. In other words, the user is more willing to accept a smaller-than-desired print size, and less willing to accept a print with a less permanent ink type.

By applying the above operations to the exemplary proof sheet 1100, the first adjustment is to change the print size to "5×7". This yields an adjusted printing cost of $3.00 per image. Since the user has specified a print size of "5×7" as the minimum acceptable, the next higher priority print characteristic, print finish, is examined. Here, however, no adjustment is possible because the minimum acceptable setting is the same as the desired setting of "Glossy". The highest priority print characteristic, ink type, is then adjusted to "Standard". This yields an adjusted printing cost of $2.25 per image.

At 1010, it is determined whether the adjusted printing cost exceeds the maximum cost. If not ("No" branch of 1010), the cost requirement is met. However, for the exemplary user-marked proof sheet 1100, the adjusted printing cost of $2.25 per image does exceed the user-specified maximum cost of $2.00 per image, and therefore execution continues at 1012. Execution would also continue at 1012 if no minimum acceptable print characteristic settings were specified by the user ("No" branch of 1006).

At 1012, it is determined whether or not machine-suggested adjustments beyond those specified by the user are to be entertained. In some embodiments, these machine-suggested adjustments may be generated by cost manager 182 (FIG. 1). If machine-suggested adjustments are not allowed, then the maximum cost cannot be met. On exemplary proof sheet 1110, however, machine-suggested adjustments are allowed, so at 1014 adjustments to the print characteristics to meet or approach the maximum cost are proposed. In some embodiments, only adjustments that meet the maximum cost are proposed, while in other embodiments the adjustments that come closest to meeting the maximum cost may be proposed even if the maximum cost cannot be met. In the example of proof sheet 1110, further adjusting the print size to "4×6" allows a print cost of $2.00 to be achieved, which will meet the maximum cost specified by the user. If this proposed adjustment is accepted by the user ("Yes" branch of 1016), then the maximum cost is met. If this proposal is not acceptable to the user ("No" branch of 1016), then the maximum cost is not met.

Figure 9:
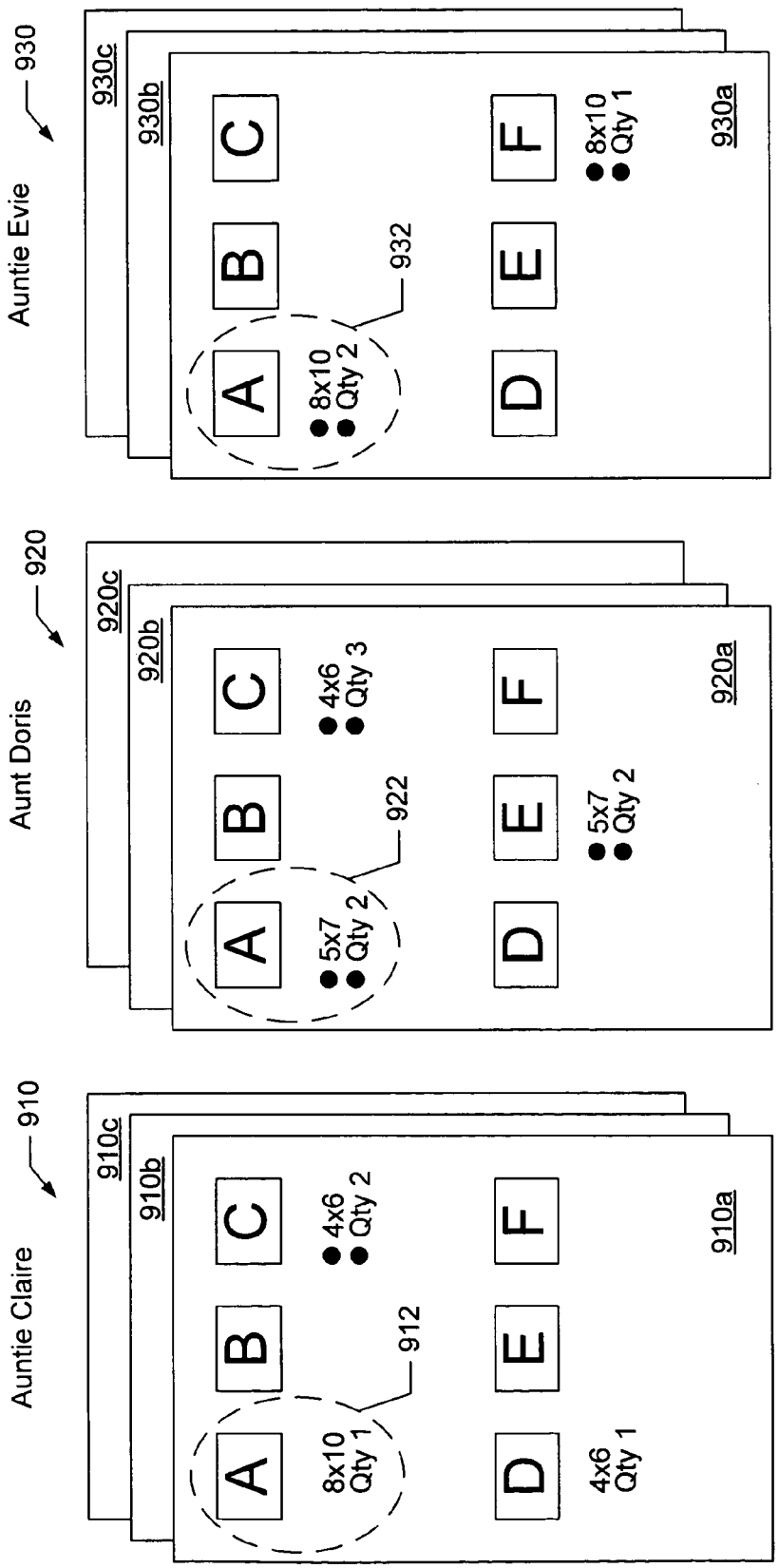
FIG. 9 is an illustration of three exemplary user-marked proof sheet sets useful as an example for illustrating the operation of the flowcharts of FIGS. 8 and 12.
Figure 12:
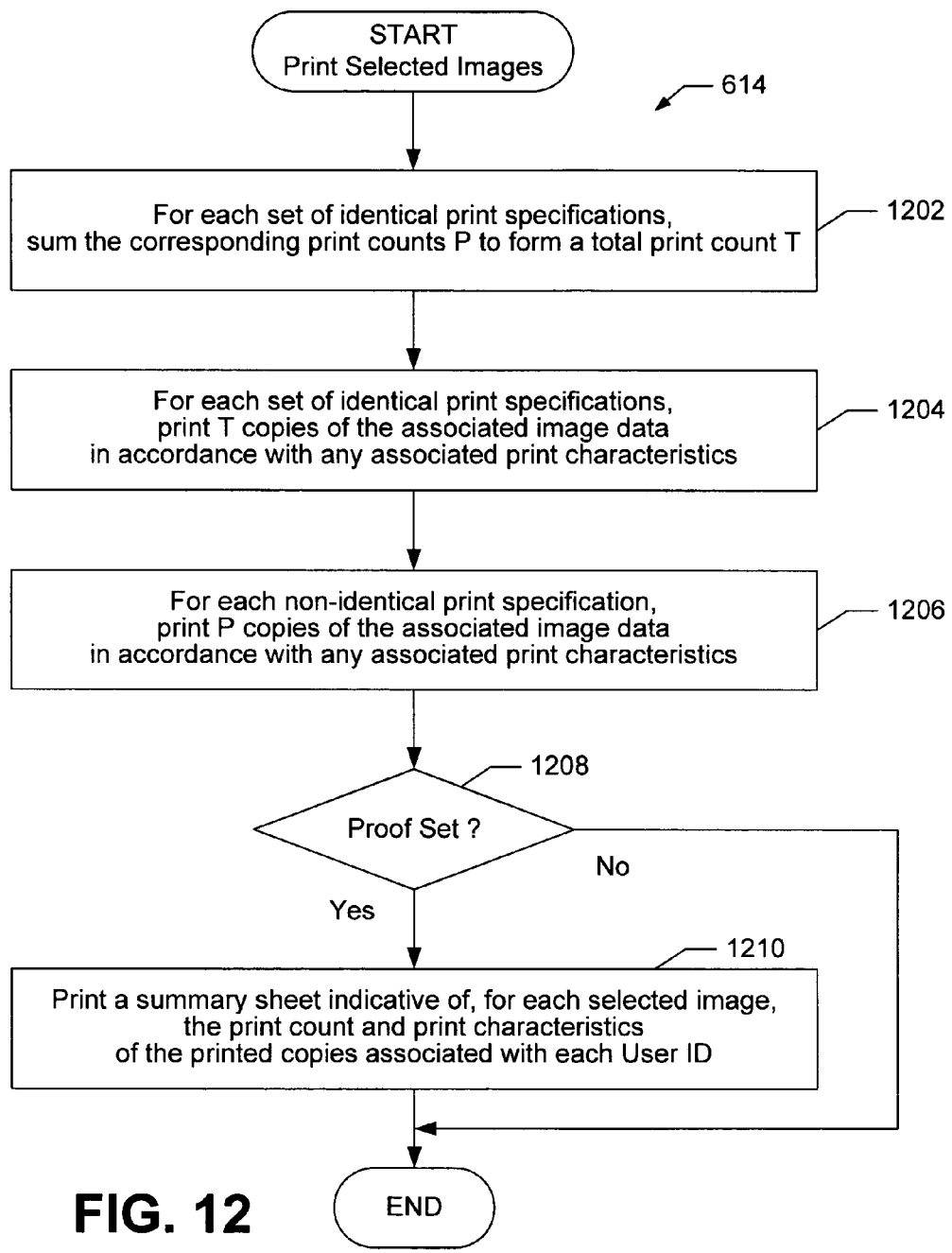
FIG. 12 is a lower-level flowchart of one embodiment according to the present invention of a selected image printing aspect of FIG. 6.

Considering now in further detail one embodiment of the printing 614 of all the selected images from all the scanned proof sheets, and with reference to FIGS. 9 and 12, the printing of sets of selected images having identical print specifications 190 (FIG. 1) is performed at 1202,1204. For each set of selected images that have identical print specifications 190, at 1202 the print counts P associated with each selected image in the set are summed to form a total print count T for the set. At 1204, T copies of the common image data associated with each set are printed in accordance with the common print characteristics of the set.

For example, with regard to the exemplary proof sets 910, 920,930, as explained previously selected images 912,932 have the same print specification 190. For image 912, P=1, while for image 932, P=2. Therefore, T=3 copies of the image data associated with images 912,932 will be printed with a print size of 8×10.

At 1206, for each selected image that does not have the same print specification 190 as any other selected image, P copies of the image data associated with the image are printed in accordance with the print specifications for the image.

If the proof sheets that were used to specify the images were part of a proof set ("Yes" branch of 1208), then at 1210 a summary sheet is printed. One embodiment of the summary sheet, as best understood with reference to exemplary summary sheet 1310 of FIG. 13, may assist with distributing the various prints to the proper users. Summary sheet 1310 is, for each selected image, indicative of the print count and print characteristics of the prints associated with each user identifier. For example, for image A, one 8×10 print goes to Auntie Claire, two 5×7 prints go to Aunt Doris, and two 8×10 prints go to Auntie Evie.

Figure 14:
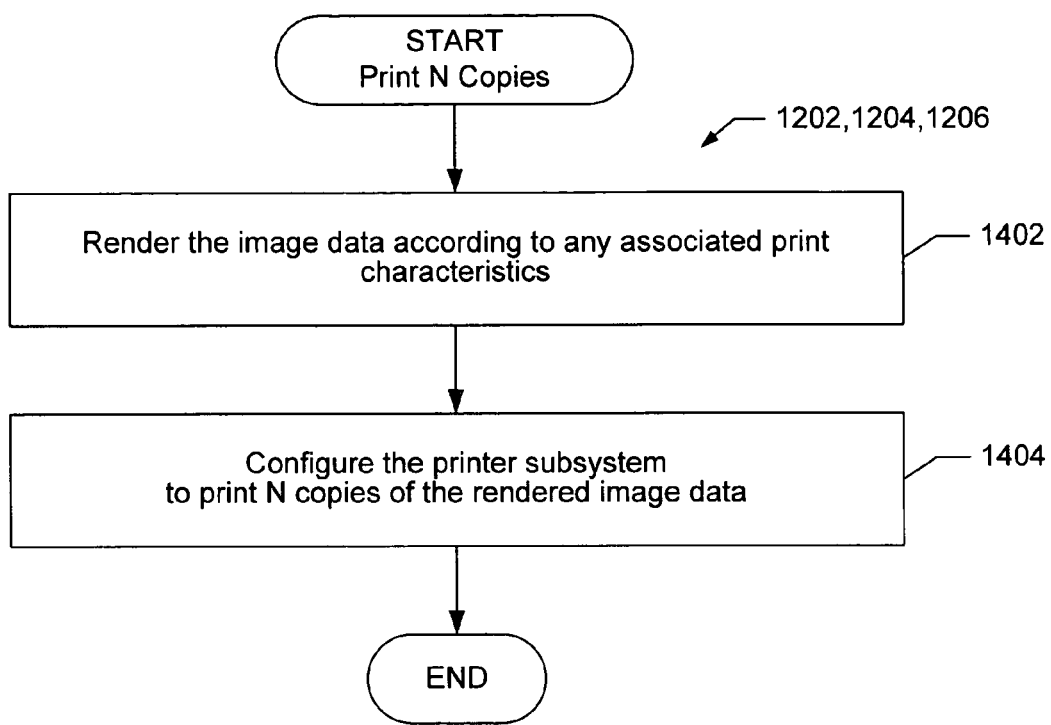
FIG. 14 is a lower-level flowchart of one embodiment according to the present invention of a copy printing aspect of FIG. 12.

Considering now in further detail one embodiment of printing 1202,1204,1206 a number of copies N of image data, and with reference to FIG. 14, at 1402 the image data is rendered according to the associated print characteristics. At 1404, the printer subsystem is configured to print N copies of the rendered image data. For some printer subsystems, rendering once and printing N times can result in significantly faster printing, thus saving time.

Figure 15:
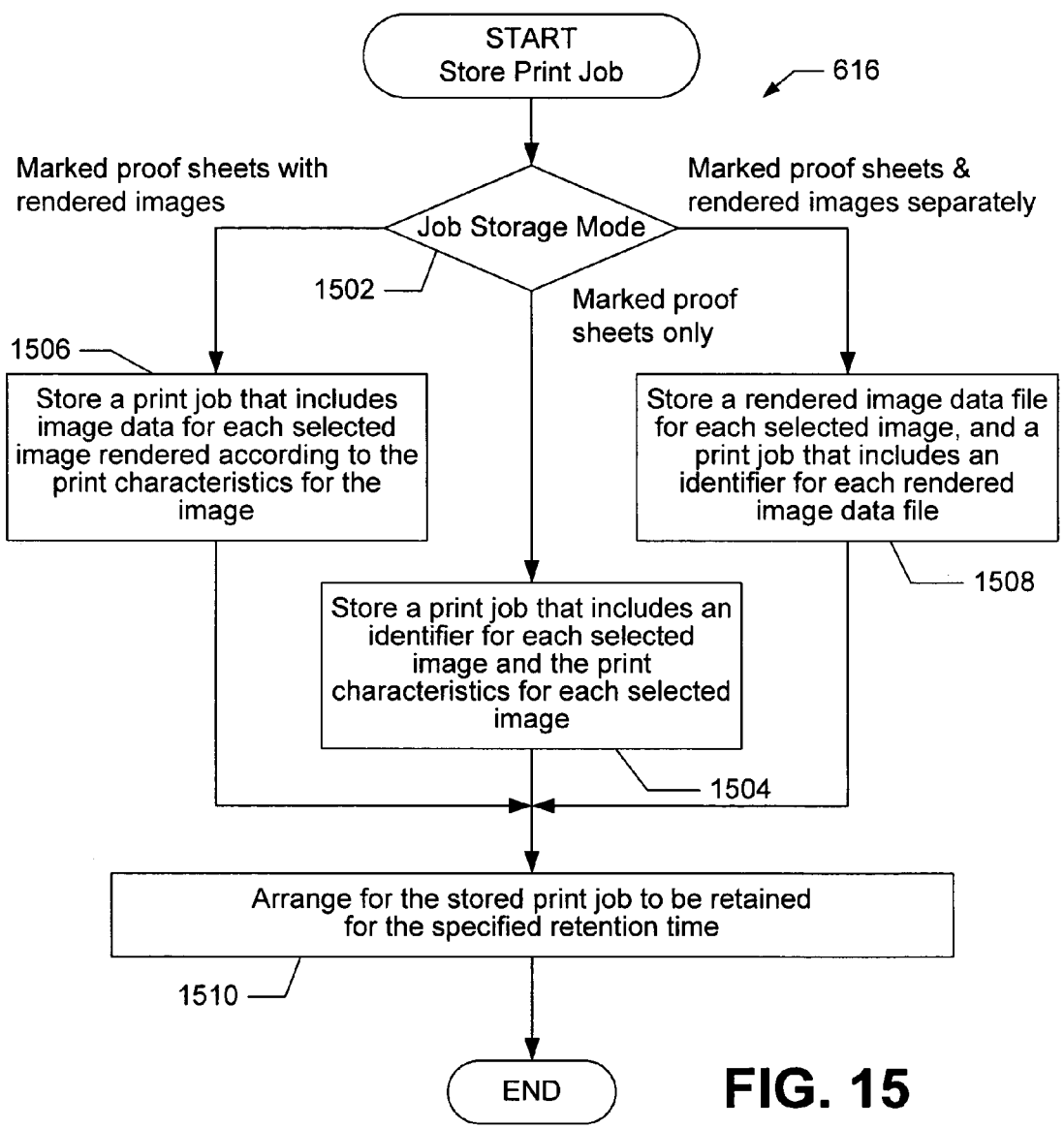
FIG. 15 is a lower-level flowchart of one embodiment according to the present invention of a print job storing aspect of FIG. 6.

Considering now in further detail one embodiment of storing 616 a print job, and with reference to FIG. 15, at 1502 a job storage mode is determined. The job storage mode may be specified via a marked field 420 in storage mode subregion 452 of proof sheet 120c. If the job storage mode specifies that only the marked proof sheets are to be stored in the print job, then at 1504 a print job is stored that includes an identifier for each selected image and the print characteristics associated with each selected image. If the job storage mode specifies that the marked proof sheets are to be stored with the rendered images, then at 1506 a print job is stored that includes image data for each image rendered according to the print characteristics associated with the corresponding image. If the job storage mode specifies that the marked proof sheets and the rendered images are to be stored separately, then at 1508 a rendered image data file is stored for each selected image, and a print job that includes an identifier for each rendered image data file is also stored. After the storing 1504,1506,1508, the stored print job is arranged to be retained for the specified retention time at 1510. The retention time may be specified via a marked field 420 in retention time subregion 454 of proof sheet 120c. In one embodiment, retention may be accomplished by scheduling a deletion operation to be performed by the operating system 162 (FIG. 1) at the specified time.

The stored print job advantageously allows a selected set of images to be reprinted without the need to re-scan the marked proof sheets. This mitigates the risk of losing or destroying the marked proof sheets after the set of images is printed the first time. In this way, if a user loses his or her printed copies and desires replacements, or wishes to procure another set of printed copies for a friend or relative, it can be accomplished in a convenient manner. The stored print job can be reloaded and the printing 614 (FIG. 12) performed to produce the additional printed copies.

Another embodiment of the invention, as best understood with reference to FIG. 16, is a method 1600 of printing subsets of images selected from a collection of images. At 1602, a collection of images is identified. At 1604, at least one proof set is printed, each proof set including at least one proof sheet having user-markable fields. At 1606, each proof set is distributed to a user for making optically scanable marks thereon which define a user-specific subset of the images to be printed. At 1608, the user-marked proof sets are retrieved. At 1610, the user-marked proof sheets are optically scanned to detect the user-marked fields thereon. At 1612, the user-marked fields are processed to determine the images associated with each user-specific subset. At 1614, the user-specific subsets are collated to determine, for each image, a total number of copies to be printed according to a particular set of print characteristics. At 1616, the total number of copies of each image are printed according to the corresponding particular set of print characteristics. At 1618, a summary sheet indicative of the images in each individual subset is printed. At 1620, the printed copies of the images are distributed to the users in accordance with the summary sheet.

From the foregoing it will be appreciated that the printing system, multifunction printer, and methods provided by the present invention represent a significant advance in the art. Although several specific embodiments of the invention have been described and illustrated, the invention is not limited to the specific methods, forms, or arrangements of parts so described and illustrated. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of printing user-selected ones of a collection of images, comprising:
   printing a plurality of proof sheets each having a thumbnail representation of at least some of the images, and at least one user-markable field indicative of at least one corresponding image when marked;
   optically scanning a plurality of user-marked ones of the proof sheets to detect marked ones of the at least one user-markable field;
   processing the marked ones of the fields to determine at least one selected image associated with each scanned proof sheet and a print count associated with each selected image; and
   printing the at least one selected image after the plurality of user-marked proof sheets have been scanned, wherein the printing includes:
   determining identical ones of the selected images;
   summing the print counts of the identical selected images to form a total print count T; and
   printing T copies of one of the identical selected images.

2. The method of claim 1, wherein the print count is a print count P, the method including:
   printing P copies of each non-identical one of the selected images.

3. The method of claim 1, wherein the at least one user-markable field is further indicative of a print characteristic associated with at least one of the images;
   wherein the processing includes processing the marked ones to identify at least one specified print characteristic associated with at least one of the selected images; and
   wherein the determining includes determining identical ones of a combination of the selected images and the associated specified print characteristics.

4. The method of claim 1, wherein the printing T copies includes:
   rendering the one of the identical selected images once to form a rendered image; and
   printing the rendered image T times.

5. The method of claim 1, wherein the images are digitally stored images, and wherein the proof sheet includes at least one identity marker capable of locating each digitally stored image.

6. The method of claim 1, wherein the processing includes forming a print job, the method comprising:
   storing the print job in a memory.

7. The method of claim 1, comprising:
   determining a printing cost associated with printing the at least one selected image; and
   inhibiting the printing if the printing cost exceeds a user-specified maximum cost.

8. A method of printing user-selected ones of a collection of images, comprising:
- printing a plurality of proof sets, each set including a proof sheet having thumbnail representations of at least some of the images,
- at least one user-markable print characteristic field associated with at least one of the thumbnail representations, and
- at least one user-markable print count field associated with at least one of the thumbnail representations;
- optically scanning at least some of the proof sheets to detect user-marked ones of the print characteristic fields and print count fields;
- processing the user-marked ones to determine selected images, and further to associate at least one print characteristic and a print count with each selected image, each selected image and associated print characteristics forming a print specification;
- determining identical ones of the print specifications;
- summing the print counts associated with all of the identical ones to form a total print count T; and
- printing T copies of the selected image associated with the identical ones in accordance with the associated print characteristics.

9. The method of claim 8, wherein each of the plurality of proof sets represents the collection of images.

10. The method of claim 9, wherein each proof sheet in one of the proof sets represents a unique subset of the collection of images, and wherein each individual proof sheet in the one proof set represents the same images as another individual proof sheet in each other proof set.

11. The method of claim 9, wherein the printing a plurality of proof sets includes printing on each proof sheet an event identifier associated with the proof set.

12. The method of claim 9, comprising:
- associating a user identifier with one of the plurality of proof sets.

13. The method of claim 12, wherein the user identifier is unique for each proof set.

14. The method of claim 12, comprising:
- printing a summary sheet indicative of the print count and at least some of the print characteristics for each selected image associated with each user identifier.

15. The method of claim 8, wherein the print characteristic is at least one of print size, paper type, and media marking substance.

* * * * *

UNITED STATES PATENT AND TRADEMARK OFFICE
CERTIFICATE OF CORRECTION

PATENT NO. : 7,525,675 B2 Page 1 of 1
APPLICATION NO. : 10/774261
DATED : April 28, 2009
INVENTOR(S) : Michael J. Shelton et al.

It is certified that error appears in the above-identified patent and that said Letters Patent is hereby corrected as shown below:

Title page, Item (73), "Assignee", delete "L.P" and insert -- L.P. --, therefor.

Signed and Sealed this

Thirty-first Day of August, 2010

David J. Kappos
*Director of the United States Patent and Trademark Office*